United States Patent [19]
Wünsch et al.

[11] Patent Number: 6,048,951
[45] Date of Patent: Apr. 11, 2000

[54] PROCESS FOR THE PREPARATION OF COPOLYMERISATES OF VINYL AROMATIC COMPOUNDS IN A STAGE USING DOUBLE SCREW EXTRUDERS

[75] Inventors: Josef Wünsch, Schifferstadt; Jürgen Hofmann, Ludwigshafen; Thomas Kessler, Schifferstadt, all of Germany

[73] Assignee: BASF Aktiengesellschaft, Ludwigshafen, Germany

[21] Appl. No.: 09/077,608

[22] PCT Filed: Dec. 2, 1996

[86] PCT No.: PCT/EP96/05329

§ 371 Date: Jun. 2, 1998

§ 102(e) Date: Jun. 2, 1998

[87] PCT Pub. No.: WO97/21741

PCT Pub. Date: Jun. 19, 1997

[30] Foreign Application Priority Data

Dec. 11, 1995 [DE] Germany ............... 195 46 095

[51] Int. Cl.[7] ................. C08F 4/44; C08F 4/70
[52] U.S. Cl. ............ 526/160; 526/144; 526/160; 526/117
[58] Field of Search ............... 526/144, 160, 526/347.2, 159, 117; 502/117

[56] References Cited

U.S. PATENT DOCUMENTS

| | | | |
|---|---|---|---|
| 4,680,353 | 7/1987 | Ishihara et al. | 526/160 |
| 4,794,096 | 12/1988 | Ewen | 502/117 |
| 4,950,724 | 8/1990 | Malanga et al. | 526/144 |

FOREIGN PATENT DOCUMENTS

| | | |
|---|---|---|
| 284 708 | 10/1988 | European Pat. Off. . |
| 0311099 | 4/1989 | European Pat. Off. . |
| 0379128 A2 | 7/1990 | European Pat. Off. . |
| 379 128 | 7/1990 | European Pat. Off. . |
| 0490269 A1 | 6/1992 | European Pat. Off. . |
| 490 269 | 6/1992 | European Pat. Off. . |
| 0522641 A2 | 1/1993 | European Pat. Off. . |
| 522 641 | 1/1993 | European Pat. Off. . |
| 0584646 A2 | 3/1994 | European Pat. Off. . |
| 584 646 | 3/1994 | European Pat. Off. . |
| 91/09882 | 7/1991 | WIPO . |
| 93/03067 | 2/1993 | WIPO . |

OTHER PUBLICATIONS

Billmeyer F, "Textbook of Polymer Science", 3–d edition, pp. 461–461, 1984.

Jrl. Org. Chem., 369 (1989) 359–370, Wiesenfeldt et al.

Beilsteins Handbuch der Organischem Chemie, 1922, 474, 485, 367.

*Primary Examiner*—David W. Wu
*Assistant Examiner*—Tanya Zulukaeva
*Attorney, Agent, or Firm*—Keil & Weinkauf

[57] ABSTRACT

Process for preparing copolymers of aromatic vinyl compounds at −80 to 150° C. in the presence of metallocene catalyst systems using a corotating, closely intermeshing twin-screw extruder for polymerization.

21 Claims, No Drawings

PROCESS FOR THE PREPARATION OF COPOLYMERISATES OF VINYL AROMATIC COMPOUNDS IN A STAGE USING DOUBLE SCREW EXTRUDERS

DESCRIPTION

The present invention relates to processes for preparing copolymers of vinyl-aromatic compounds at −80–150° C. in the presence of metallocene catalyst systems.

The present invention also relates to the use of the copolymers obtainable in such a process for producing fibers, films and moldings and to the fibers, films and moldings obtainable therefrom.

Copolymers of vinyl-aromatic compounds, especially styrene, have properties which make them useful in numerous areas, for example as packaging materials or insulation coatings for metals or plastics, especially in electrical applications.

EP-A 311 099 and EP-A 490 269 describe processes for preparing styrene copolymers using stirred vessels. A disadvantage of this is that the copolymers are awkward to handle.

It is an object of the present invention, therefore, to provide new processes for preparing copolymers of vinyl-aromatic compounds without such disadvantages and, in particular, in a technically less complex manner.

We have found that this object is achieved by processes for preparing copolymers of vinyl-aromatic compounds at −80 to 150° C. in the presence of metallocene catalyst systems, in which polymerization is carried out using a corotating, closely intermeshing twin-screw extruder.

We have also found that the copolymers obtainable in such a process can be used to produce fibers, films and moldings and have found the fibers, films and moldings obtainable therefrom.

Particularly suitable vinyl-aromatic compounds are compounds of the formula I

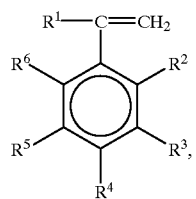

(I)

where $R^1$ is hydrogen or $C_1$–$C_4$-alkyl, $R^2$–$R^6$ independently are hydrogen, $C_1$–$C_{12}$-alkyl, $C_6$–$C_{18}$-aryl or halogen or two adjacent radicals together are a $C_4$–$C_{15}$ cyclic group.

Preference is given to the use of vinyl-aromatic compounds of the formula I, where $R^1$ is hydrogen and and $R^2$–$R^6$ are hydrogen, $C_1$–$C_4$-alkyl, chlorine or phenyl or where two adjacent radicals together are a $C_4$–$C_{12}$ cyclic group such that examples of compounds of the general formula I are naphthalene derivatives or anthracene derivatives.

Examples of such preferred compounds are styrene, p-methylstyrene, p-chlorostyrene, 2,4-dimethylstyrene, 4-vinylbiphenyl, 2-vinylnaphthalene or 9-vinylanthracene.

It is also possible to use mixtures of different vinyl-aromatic compounds but preferred to use only one.

Particularly preferred vinyl-aromatic compounds are styrene and p-methylstyrene.

The preparation of vinyl-aromatic compounds of the general formula I is known per se and is described, for example, in Beilstein 5, 367, 474, 485.

Comonomers used in the process according to the invention are preferably aromatic compounds having at least two unsaturated hydrocarbon radicals.

Suitable examples are compounds of the formula II

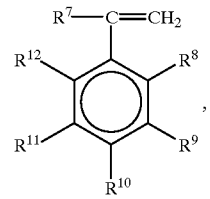

II where $R^7$ is hydrogen or $C_1$–$C_4$-alkyl, $R^8$–$R^{12}$ independently are hydrogen, $C_1$–$C_{12}$-alkyl, $C_6$–$C_{18}$-aryl or halogen or an unsaturated $C_2$–$C_{10}$ hydrocarbon radical, at least one of $R^8$–$R^{12}$ being an unsaturated $C_2$–$C_{10}$ hydrocarbon radical, or where two adjacent radicals together are a $C_4$–$C_{15}$ cyclic group which may itself carry unsaturated $C_2$–$C_{10}$ hydrocarbon radicals.

Preferred compounds of the formula II are those in which $R^7$ is hydrogen and $R^8$–$R^{12}$ are hydrogen, $C_1$–$C_4$-alkyl, phenyl or chlorine or an unsaturated $C_2$–$C_6$ hydrocarbon radical, at least one of $R^8$–$R^{12}$ being an unsaturated $C_2$–$C_6$ hydrocarbon radical, or where two adjacent radicals together are a $C_4$–$C_{12}$ cyclic group, such that examples of compounds of the general formula II are naphthalene derivatives or anthracene derivatives, said cyclic groups in turn possibly carrying unsaturated $C_2$–$C_6$ hydrocarbon radicals.

Examples of such preferred compounds are p-divinylbenzene, m-divinylbenzene, trivinylbenzenes, allylstyrenes, methallylstyrenes, butenylstyrenes, pentenylstyrenes, divinylnaphthalenes and divinylanthracenes.

Thus examples of the unsaturated hydrocarbon radicals are vinyl, allyl, methallyl, butenyl or pentenyl, preferably vinyl.

It is also possible to use mixtures of different aromatic compounds having at least two unsaturated hydrocarbon radicals.

The preparation of such aromatic compounds having at least two unsaturated hydrocarbon radicals is known per se and is described, for example, in "Die angewandte Chemie", Int. Ed. 2, 1963, 98.

The ratio of vinyl-aromatic compound to the comonomer is preferably 1,000,000:1–0.001:1, especially 100,000:1–1:1.

In the processes according to the invention the metallocene complexes A) used are preferably those of the formula III

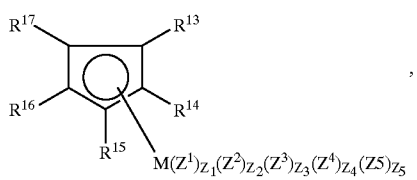

where:
- $R^{13}$–$R^{17}$ are hydrogen, $C_1$–$C_{10}$-alkyl, 5–7-membered cycloalkyl with or without $C_1$–$C_6$-alkyl substituents, $C_6$–$C_{15}$-aryl or arylalkyl, two adjacent radicals together possibly being a $C_4$–$C_{15}$ cyclic group, or $Si(R^{18})_3$, where $R^{18}$ is $C_1$–$C_{10}$-alkyl, $C_6$–$C_{15}$-aryl or $C_3$–$C_{10}$-cycloalkyl,
- M is a metal from subgroups III–IV of the Periodic Table of the Elements or a metal of the lanthanide series,
- $Z^1$–$Z^5$ are hydrogen, halogen, $C_1$–$C_{10}$-alkyl, $C_6$–$C_{15}$-aryl, $C_1$–$C_{10}$-alkoxy or $C_1$–$C_{15}$-aryloxy and $z_1$–$z_5$ are 0, 1, 2, 3, 4 or 5, the sum $z_1+z_2+z_3+z_4+z_5$ corresponding to one less than the valency of M.

Particularly preferred metallocene complexes of the formula III are those where

M is a metal from subgroup IV of the Periodic Table of the Elements, i.e. titanium, zirconium or hafnium, especially titanium, and $Z^1$ to $Z^5$ are $C_1$–$C_{10}$-alkyl, $C_1$–$C_{10}$-alkoxy or halogen.

Examples of such preferred metallocene complexes are pentamethylcyclopentadienyltitanium trichloride, pentamethylcyclopentadienyltitanium trimethyl and pentarmethylcyclopentadienyltitanium trimethylate.

It is also possible to use those metallocene complexes described in EP-A 584 646, or mixtures of different metallocene complexes.

Complex compounds of this kind can be synthesised by known methods, preferably by reacting the appropriately substituted cyclic hydrocarbon anions with halides of titanium, zirconium, hafnium, vanadium, niobium or tantalium.

Examples of relevant preparation methods are described inter alia in the Journal of Organometallic Chemistry, 369 (1989), 359–370.

As metallocerium ion former B), the catalyst systems can contain open-chain or cyclic alumoxane compounds, suitable examples being those of the formula V or VI

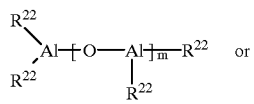

V

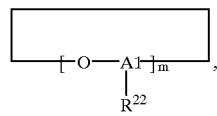

VI where $R^{22}$ is $C_1$–$C_4$-alkyl, preferably methyl or ethyl, and m is an integer from 5 to 30, preferably from 10 to 25.

The preparation of these oligomeric alumoxane compounds is commonly by reacting a solution of trialkylaluminum with water and is described, inter alia, in EP-A 284 708 and U.S. Pat. No. 4,794,096.

In general the resulting oligmeric alumoxane compounds are mixtures of molecules with chains of different length, both linear and cyclic, and so m should be regarded as an average value. The alumoxane compounds may also be mixed with other metal alkyls, preferably aluminum alkyls.

It has been found advantageous to use the metallocene complexes and oligomeric alumoxane compound in amounts such that the atomic ratio between aluminum from the oligomeric alumoxane compound and transition metal from the metallocene complexes is $10:1$–$10^6:1$, especially $10:1$–$10^4:1$.

The metallocenium ion former B) can also be a co-ordination complex compound selected from the group consisting of strong neutral Lewis acids, ionic compounds containing Lewis acid cations, and ionic compounds containing Brönsted acid cations.

Preferred strong neutral Lewis acids are compounds of the formula VII $$M^1X^1X^2X^3 \qquad \text{VII}$$

where

- $M^1$ is an element from main group III of the Periodic Table, especially B, Al or Ga, preferably B, and
- $X^1$, $X^2$ and $X^3$ are hydrogen, $C_1$–$C_{10}$-alkyl, $C_6$–$C_{15}$-aryl, alkylaryl, arylalkyl, haloalkyl or haloaryl each with 1–10 alkyl carbons and 6–20 aryl carbons, or are fluorine, chlorine, bromine or iodine, and are especially haloaryl, preferably pentafluorophenyl.

Particularly preferred compounds of the general formula VII are those in which $X^1$, $X^2$ and $X^3$ are identical, preferably tris(pentafluorophenyl)borane. These compounds and their preparation are known per se and are described, for example, in WO 93/3067.

Suitable ionic compounds containing Lewis acid cations are compounds of the formula VIII $$[(Y^{a+})Q_1Q_2\ldots Q_z]^{d+} \qquad \text{VIII}$$

where

- Y is an element from main groups I–VI or subgroups I–VIII of the Periodic Table,
- $Q_1$–$Q_z$ are mononegatively charged radicals such as $C_1$–$C_{28}$-alkyl, $C_6$–$C_{15}$-aryl, alkylaryl, arylalkyl, haloalkyl or haloaryl each having 6–20 aryl carbons and 1–28 alkyl carbons, $C_1$–$C_{10}$-cycloalkyl which is unsubstituted or substituted by $C_1$–$C_{10}$-alkyl, or are halogen, $C_1$–$C_{28}$-alkoxy, $C_6$–$C_{15}$-aryloxy, silyl or metcapto
- a is an integer 1–6,
- z is an integer 0–5, and
- d is the difference $a–z$ that is greater than or equal to 1.

Carbonium, oxonium and sulfonium cations and also cationic transition metal complexes are particularly suitable. The triphenylmethyl cation, the silver cation and the 1,1'-dimethylferrocenyl cation deserve particular mention.

They preferably possess noncoordinating counterions, especially boron compounds, as are also mentioned in WO 91/09882, preferably tetrakis(pentafluorophenyl) borate.

Ionic compounds with Brönsted acid cations and preferably likewise noncoordinating counterions are disclosed in WO 93/3067; the preferred cation is N,N-dimethylanilinium.

It has been found particularly appropriate for the molar ratio of boron from the metallocenium ion former to transition metal from the metallocene complex to be 0.1:1–10:1, especially 1:1–5:1.

The catalyst system employed in the process according to the invention includes as component C) a aluminum compound of the formula IV $$AlR^{19}R^{20}R^{21} \qquad (IV),$$

where $R^{19}$–$R^{21}$ are fluorine, chlorine, bromine, iodine or $C_1$–$C_{12}$-alkyl, preferably $C_1$–$C_8$-alkyl.

$R^{19}$–$R^{21}$ are preferably identical and are methyl, ethyl, isobutyl or n-hexyl.

The preferred proportion of component C) in the catalyst system is 2000:1–1:1, especially 800:1–10:1 (molar ratio of Al from IV to transition metal from III).

As solvents for the metallocene complexes it is common to employ aromatic hydrocarbons preferably of 6–20 carbons, especially xylenes and toluene, and mixtures thereof.

Metallocene complexes can be used with or without a support.

Examples of suitable supports are silica gels, preferably those of the formula $SiO_2 \cdot bAl_2O_3$, where b is 0–2, preferably 0–0.5; ie. essentially alumina silicates or silica. The preferred particle diameter of the supports is 1–200 μm, especially 30–80 μm. Such products are commercially available, for example, as Silica Gel 332 from Grace.

Other supports include finely divided polyolefins, for example finely divided polypropylene or polyethylene, and polyethylene glycol, polybutylene terephthalate, polyethylene terephthalate, polyvinyl alcohol, polystyrene, polybutadiene, polycarbonates or copolymers thereof.

The process of the invention is carried out using a corotating, closely intermeshing and therefore self-cleaning twin-screw extruder, preferably in one stage, at –80–150° C., preferably 0–120° C. However, it is also possible to apply a gradient from 0 to 120° C. by means of heatable barrel jackets around the reaction tube.

The extruder can consist of a plurality of individual zones which can be heated at different temperatures.

The external diameter of the corotating, preferably double flighted kneading and conveying elements of the twin-screw extruder is preferably 25–70 mm, especially 30–58 mm.

The gaps between extruder barrel and screw flight are 0.2–0.8 mm, especially 0.3–0.5 mm.

The screw speed can be 3–500 rpm, preferably 5–30 rpm.

The mean extruder residence time can be 0.1–240 minutes, preferably 2–20 minutes, and can be regulated via the number of barrel sections, which is preferably 6–20, especially 8–12. It is particularly preferred to use 10 barrel sections: in the first, back-degassing takes place; the starting materials are metered into the second; sections 3–8 are for reaction, sections 9 and 10 can be heated differently in terms of temperature, and section 10 is a discharge barrel.

The process according to the invention is preferably carried out such that the vinyl-aromatic compound, the comonomer, the metallocenium ion former B) and the aluminum compound C) are mixed under an inert gas atmosphere and metered into the first barrel section of the extruder. In parallel it is likewise possible to meter a solution or suspension of the metallocene complex A) into the first barrel section (zone).

Suitable solvents or suspension media are cyclic and acyclic hydrocarbons such as butanes, pentanes, hexanes or heptanes, and also aromatic hydrocarbons such as benzene, toluene or ethylbenzene, and oxygen-containing hydrocarbons such as tetrahydrofuran, halogenated hydrocarbons such as dichloromethane, or nitrogen-containing hydrocarbons such as N-methylpiperidine, and mixtures of these.

The metering rate is preferably such that 500–2,000 g of the mixture of vinyl-aromatic compound, components B) and C), and 100– 200 cm$^3$ of the solution or the suspension of the metallocene complex, are metered in per hour.

The polymerization is preferably carried out in the vinyl-aromatic compound as reaction medium, i.e. in bulk.

The process according to the invention is technically simple to carry out, high conversions are achieved, the risk of sticking or of gradual obstruction of the extruder outlets is low, and the copolymers formed are syndiotactic and particularly suitable for use as molding compounds in electrical or heat-resistant applications. Since the copolymers formed include an vinyl-aromatic group, they are also suitable as starting materials for other chemical reactions.

EXAMPLES

Example 1

Preparation of a Styrene-divinylbenzene Copolymer 12.0 kg of styrene (115.2 mol) and 12 g of divinyl benzene (0.092 mol) (isomer mixture) were mixed with 1.642 kg of methylaluminumoxane (2.881 mol; Witco) and 1.427 kg of triisobutylaluminum (1.440 mol; Witco) under inert gas (nitrogen) and the mixture was metered using a gear pump (from Feinpruf) into a ZE 40A twin-screw extruder (Berstorff) at a rate of 1 kg of mixture per hour. The temperature of the first barrel section was 61° C. and was kept constant over all of the barrel sections. In parallel with the metering of this mixture, 2.1912 g (0.0096 mol) of (pentamethylcyclopentadienyl)trimethyltitanium dissolved in 1.2 l of toluene was metered in, likewise at the first barrel section, using a LEWA piston pump (from M3) and at a rate of 100 ml of solution per hour.

The resulting copolymer was taken off as a powder from the head end of the extruder.

| | |
|---|---|
| Conversion (based on styrene): | 78% |
| Syndiotacticity:. | 98.5% |
| Molecular weight $M_w$: | 992000 |
| $M_w/M_n$: | 2.79 |
| Proportion of free vinyl groups in the copolymer: | 1.9 mol % |

The weight-average ($M_w$) and number-average ($M_n$) molecular weights were determined by gel permeation chromatography using 1,2,4-trichlorobenzene as the solvent at 135° C. and a close series of polystyrene standards for calibration. The syndiotactic proportion was determined by $^{13}$C-NMR.

We claim:

1. A process for preparing a copolymer of one or more vinyl-aromatic compounds and one or more comonomers at –80 to 150° C. in the presence of a metallocene catalyst system, wherein the vinyl aromatic compounds and the comonomers are polymerized, in a corotating, closely intermeshing twin-screw extruder, said comonomers being aromatic compounds having at least two unsaturated hydrocarbon radicals.

2. The process defined in claim 1, wherein the vinyl-aromatic compounds are of the formula I

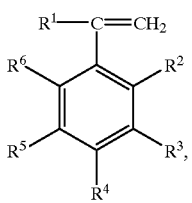

where

R$^1$ is hydrogen or C$_1$–C$_4$-alkyl, and

R$^2$–R$^6$ independently are hydrogen, C$_1$–C$_{12}$-alkyl, C$_6$–C$_{18}$-aryl or halogen, or two of the radicals R$^2$ to R$^6$ which are bonded to two adjacent carbon members of the phenyl ring together with said carbon members form a C$_4$–C$_{15}$ cyclic group.

3. The process defined in claim 1, wherein the comonomer is of the formula II

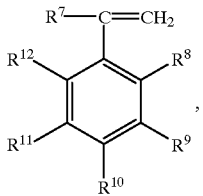

where

R$^7$ is hydrogen or C$_1$–C$_4$-alkyl, and

R$^8$–R$^{12}$ independently are hydrogen, C$_1$–C$_{12}$-alkyl, C$_6$–C$_{18}$-aryl or halogen or an unsaturated C$_2$–C$_{10}$ hydrocarbon radical, at least one of R$^8$–R$^{12}$ being an unsaturated C$_2$–C$_{10}$ hydrocarbon radical, or two of the radicals R$^8$ to R$^{12}$ which are bonded to two adjacent carbon members of the phenyl ring together with said carbon members form a C$_4$–C$_{15}$ cyclic group which may itself carry unsaturated C$_2$–C$_{10}$ hydrocarbon radicals.

4. The process defined in claim 1, wherein metallocene catalyst system comprises as active constituents A) a metallocene complex of the formula III

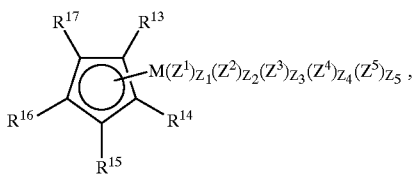

where

R$^{13}$–R$^{17}$ are hydrogen, C$_1$–C$_{10}$-alkyl, 5–7-membered cycloalkyl with or without C$_1$–C$_6$-alkyl substituents, C$_6$–C$_{15}$-aryl or aralkyl, or two of the radicals R$^{13}$ to R$^{17}$ which are bonded to two adjacent carbon members of the ring together with said carbon members form a C$_4$–C$_{15}$ cyclic group, or Si(R$^{18}$)$_3$, where R$^{18}$ is C$_1$–C$_{10}$-alkyl, C$_6$–C$_{15}$-aryl or C$_3$–C$_{10}$-cycloalkyl, M is a metal from subgroups III–IV or the Periodic Table of the Elements or a metal of the lanthanide series, Z$^1$–Z$^5$ are hydrogen, halogen, C$_1$–C$_{10}$-alkyl, C$_6$–C$_{15}$-aryl, C$_1$–C$_{10}$-alkoxy or C$_1$–C$_{15}$-aryloxy and z$_1$–z$_5$ are 0, 1, 2, 3, 4 or 5, the sum z$_1$+z$_2$+z$_3$+z$_4$+z$_5$ corresponding to one less than the valency of M, B) a metallocenium former, and C) an aluminum compound of the formula IV

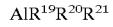

where

R$^{19}$–R$^{21}$ are fluorine, chlorine, bromine, iodine or C$_1$–C$_{12}$-alkyl.

5. The process defined in claim 1, wherein the metallocene catalyst system comprises an open chain or cyclic alumoxane compound of the general formula V or VI

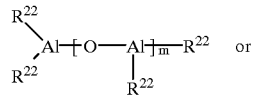

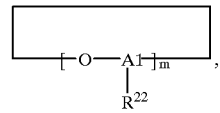

where R$^{22}$ is C$_1$–C$_4$-alkyl and m is an integer from 5 to 30.

6. The process defined in claim 1, wherein the metallocene catalyst system comprises a co-ordination complex compound selected from the group consisting of strong neutral Lewis acids, ionic compounds containing Lewis acid cations, and ionic compounds containing Brönsted acid cations.

7. A fiber, film or molding obtained from a copolymer prepared as claimed in claim 1, as essential component.

8. The process defined in claim 1, which is carried out in a corotating, closely intermeshing twin-screw extruder, said extruder having an extruder barrel comprising a multitude of barrel sections, which process comprises i) metering the vinyl-aromatic compounds, the comonomers and the metallocene catalyst system into a first or second section of the extruder barrel, ii) polymerizing the vinyl-aromatic compounds and the comonomers in the subsequent sections of the extruder barrel to give the copolymer, and iii) discharging the copolymer from the extruder barrel at the last barrel section.

9. The process defined in claim 8, wherein the vinyl-aromatic compounds are of the formula I

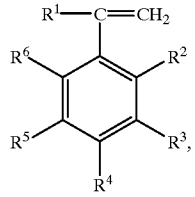

wherein

R$^1$ is hydrogen or C$_1$–C$_4$-alkyl, and

R$^2$–R$^6$ independently are hydrogen, C$_1$–C$_{12}$-alkyl, C$_6$–C$_{18}$-aryl or halogen, or two of the radicals R$^2$ to R$^6$ which are bonded to two adjacent carbon members of the phenyl ring together with said carbon members form a $C_4$–$C_{15}$ cyclic group.

10. The process defined in claim 8, wherein the comonomer is of the formula II

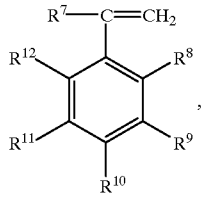

II where $R^7$ is hydrogen or $C_1$–$C_4$-alkyl, and $R^8$–$R^{12}$ independently are hydrogen, $C_1$–$C_{12}$-alkyl, $C_6$–$C_{18}$-aryl or halogen or an unsaturated $C_2$–$C_{10}$ hydrocarbon radical, at least one of $R^8$–$R^{12}$ being an unsaturated $C_2$–$C_{10}$ hydrocarbon radical, or two of the radicals $R^8$ to $R^{12}$ which are bonded to two adjacent carbon members of the phenyl ring together with said carbon members form a $C_4$–$C_{15}$ cyclic group which may itself carry unsaturated $C_2$–$C_{10}$ hydrocarbon radicals.

11. The process defined in claim 8, wherein metallocene catalyst system comprises as active constituents A) a metallocene complex of the formula III

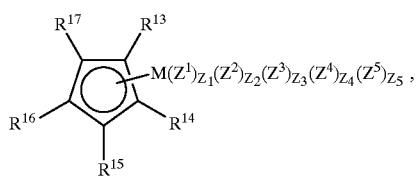

III wherein $R^{13}$–$R^{17}$ are hydrogen, $C_1$–$C_{10}$-alkyl, 5–7-membered cycloalkyl with or without $C_1$–$C_6$-alkyl substituents, $C_6$–$C_{15}$-aryl or aralkyl, or two of the radicals $R^{13}$ to $R^{17}$ which are bonded to two adjacent carbon members of the ring together with said carbon members form a $C_4$–$C_{15}$ cyclic group, or $Si(R^{18})_3$, where $R^{18}$ is $C_1$–$C_{10}$-alkyl, $C_6$–$C_{15}$-aryl or $C_3$–$C_{10}$-cycloalkyl, M is a metal from subgroups III–IV or the Periodic Table of the Elements or a metal of the lanthanide series, $Z^1$–$Z^5$ are hydrogen, halogen, $C_1$–$C_{10}$-alkyl, $C_6$–$C_{15}$-aryl, $C_1$–$C_{10}$-alkoxy or $C_1$–$C_{15}$-aryloxy and $z^1$–$z^5$ are 0, 1, 2, 3, 4 or 5, the sum $z_1+z_2+z_3+z_4+z_5$ corresponding to one less than the valency of M, B) a metallocenium former, and C) an aluminum compound of the formula IV $$AlR^{19}R^{20}R^{21} \qquad IV,$$

wherein $R^{19}$–$R^{21}$ are fluorine, chlorine, bromine, iodine or $C_1$–$C_{12}$-alkyl.

12. The process defined in claim 8, wherein the metallocene catalyst system comprises an open chain or cyclic alumoxane compound of the general formula V or VI

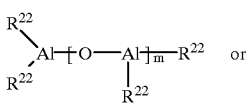

V

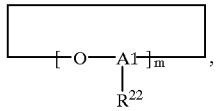

VI where $R^{22}$ is $C_1$–$C_4$-alkyl and m is an integer from 5 to 30.

13. The process defined in claim 8, wherein the metallocene catalyst system comprises a coordination complex compound selected from the group consisting of strong neutral Lewis acids, ionic compounds containing Lewis acid cations, and ionic compounds containing Brönsted acid cations.

14. The process defined in claim 11, wherein a mixture of the vinyl-aromatic compounds, the comonomers, the metallocenium former B) and the aluminium compound C) are metered into the first barrel section of the extruder.

15. The process defined in claim 11, wherein the metallocene catalyst system comprises an open chain or cyclic alumoxane compound of the general formula V or VI

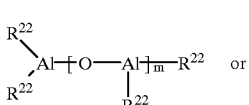

V

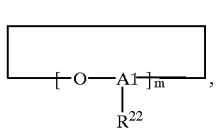

VI where $R^{22}$ is $C_1$–$C_4$-alkyl and m is an integer from 5 to 30.

16. The process defined in claim 11, wherein the metallocene catalyst system comprises a coordination complex compound selected from the group consisting of strong neutral Lewis acids, ionic compounds containing Lewis acid cations, and ionic compounds containing Brönsted acid cations.

17. The process defined in claim 11, wherein a solution or suspension of the metallocene complex A) is metered into the first barrel section of the extruder.

18. The process defined in claim 14, wherein a solution or suspension of the metellocene complex A) is metered into the first barrel section of the extruder.

19. The process defined in claim 8, wherein the barrel of the extruder comprises 6 to 10 barrel sections.

20. The process defined in claim 8, wherein a mixture of the vinyl-aromatic compounds, the comonomers and the metallocene catalyst system is metered into the second section of the extruder barrel.

21. The process defined in claim 19, wherein a mixture of the vinyl-aromatic compounds, the comonomers and the metallocene catalyst system is polymerized in sections 3 to 8 of the extruder barrel.

* * * * *

UNITED STATES PATENT AND TRADEMARK OFFICE
CERTIFICATE OF CORRECTION

PATENT NO. : 6,048,951
DATED : April 11, 2000
INVENTOR(S) : WUENSCH et al.

It is certified that error appears in the above-identified patent and that said Letters Patent is hereby corrected as shown below:

Column 10, claim 18, line 53, change "metellocene" to --metallocene--.

Signed and Sealed this

Twenty-second Day of May, 2001

*Attest:*

NICHOLAS P. GODICI

*Attesting Officer*   Acting Director of the United States Patent and Trademark Office